United States Patent [19]

Hirota

[11] Patent Number: 4,987,485
[45] Date of Patent: Jan. 22, 1991

[54] IMAGE READING APPARATUS WITH IMPROVED OUTPUT CORRECTION OF IMAGE SIGNAL

[75] Inventor: Yoshihiko Hirota, Osaka, Japan
[73] Assignee: Minolta Camera Kabushiki Kaisha, Osaka, Japan
[21] Appl. No.: 453,996
[22] Filed: Dec. 20, 1989

[30] Foreign Application Priority Data

Dec. 22, 1988 [JP] Japan .................................. 63-324265
Dec. 22, 1988 [JP] Japan .................................. 63-324266

[51] Int. Cl.⁵ .......................... G03F 3/08; H04N 1/46; H04N 9/73
[52] U.S. Cl. .......................................... 358/80; 358/29
[58] Field of Search .................................... 358/80, 29

[56] References Cited

U.S. PATENT DOCUMENTS

| | | | |
|---|---|---|---|
| 3,800,078 | 3/1974 | Cochran et al. | 358/163 |
| 4,523,229 | 6/1985 | Kanmoto | 358/163 |
| 4,554,583 | 11/1985 | Saitoh et al. | 358/163 |
| 4,577,218 | 3/1986 | Kurata | 358/75 |
| 4,679,073 | 7/1987 | Hayashi | 358/80 |
| 4,734,762 | 3/1988 | Aoki et al. | 358/80 |
| 4,821,099 | 4/1989 | Sakamoto | 358/163 |
| 4,833,533 | 5/1989 | Augusti et al. | 358/80 |

FOREIGN PATENT DOCUMENTS 63-26079 2/1988 Japan .

Primary Examiner—Howard W. Britton
Attorney, Agent, or Firm—Burns, Doane, Swecker & Mathis

[57] ABSTRACT

An image reading apparatus in accordance with the present invention reads a color image to separate the image into three primary colors by an image sensor and outputs image data corresponding to each of the colors. This image reading apparatus comprises a scanning device for making the image sensor relatively scan for a reference chart and an original, an A/D converter for converting an output of the image sensor into digital data corresponding to each of the primary colors, an operation device for evaluating correction data of each color from the output of the image sensor generated when the image sensor scans the reference chart, a multiplier for multiplying the digital data of each color by the correction data evaluated, an adder for adding a result of the multiplication and digital data before being multiplied, a shading correction circuit provided at a succeeding stage of the adder, and a line memory provided at a succeeding stage of the shading correction circuit.

10 Claims, 6 Drawing Sheets

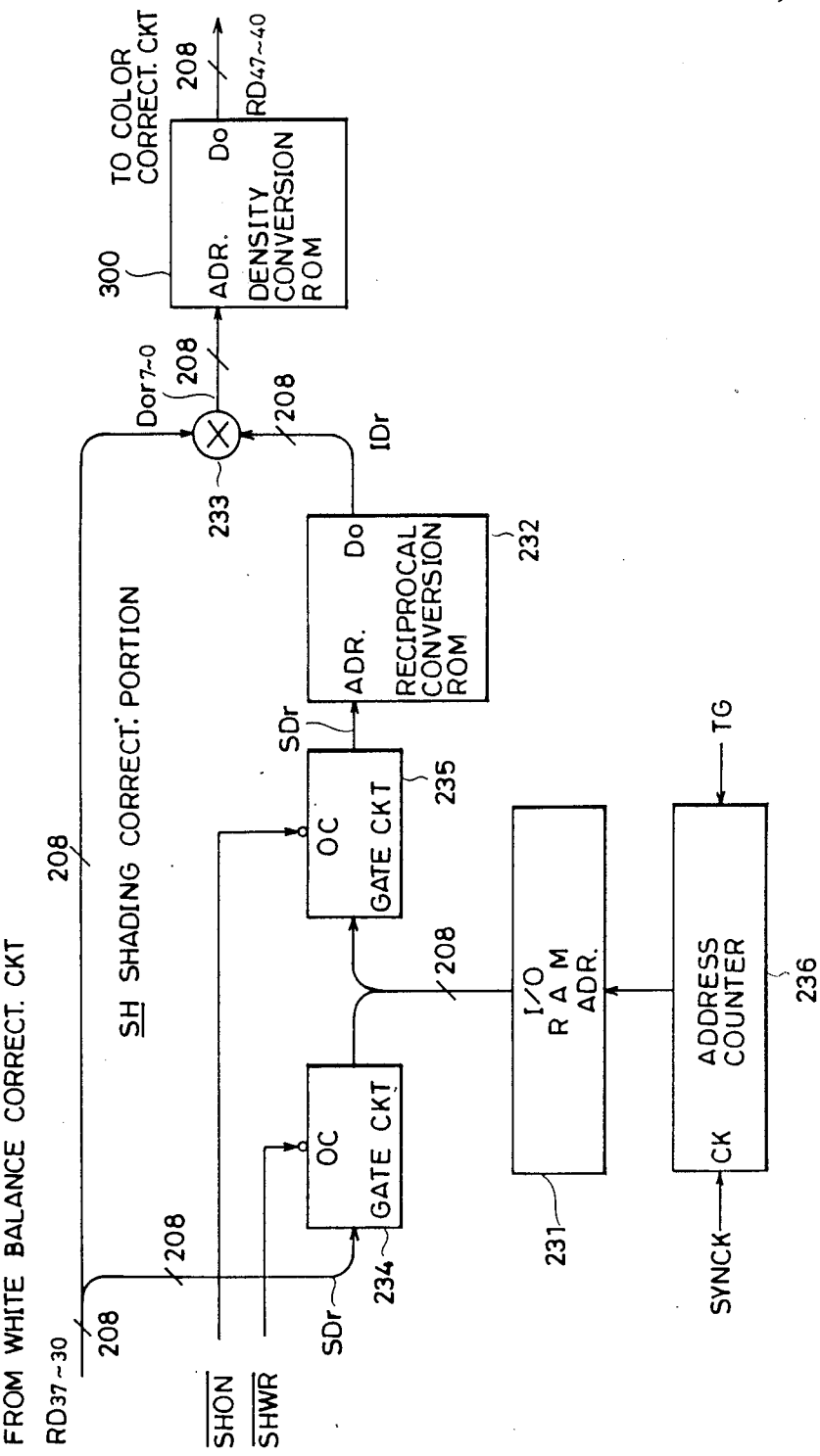

IMAGE READING APPARATUS WITH IMPROVED OUTPUT CORRECTION OF IMAGE SIGNAL

BACKGROUND OF THE INVENTION

1. Field of the Invention

The present invention relates generally to image reading apparatuses and, more particularly, to an image reading apparatus for carrying out a correction of altering a read image signal to an output signal to obtain a suitable print, particularly a white balance correction and a shading correction.

2. Description of the Related Art

An image reading apparatus has conventionally been employed as means for inputting an image of a computer or means for reading an original image of a digital type copier. In such an apparatus, a still image such as an original is read by an image sensor, and resultant image data is then subject to various image processings to output an image signal.

As an optical system of such an image reading apparatus, there is provided in general an equal-scale magnification type optical system for shifting one-dimensional image sensor (a line sensor) comprising a light source for illumination, a rod lens for converging a reflected light from the original, CCDs (Charge Coupled Devices) arranged in the direction of main scanning and the like, in the direction of sub-scanning below a platen glass on which the original is set. In an image reading apparatus for reading a color image, a color separating filter is provided for separating three primary colors, i.e., R (red), G (green) and B (blue) on a front face of a photo detecting area corresponding to each pixel of the line sensor.

A photoelectric conversion output of each of the colors transmitted from the line sensor which reads an original image as separated into the three primary colors is appropriately amplified. This photoelectric conversion output is digitized by analog/digital (A/D) conversion means, and image data based on an intensity of a reflected light of each color in each pixel is generated.

The image data is subjected to numerous image processings and then transmitted as an image signal to an image forming apparatus such as a printer.

In image processing, normalization of image data, called a white balance correction, is carried out between the image reading apparatus and the image forming apparatus in order to correctly reproduce a tone of an original color image. That is, a reference color (normally white) is determined, and thus the image data is normalized so that a relative ratio of the respective colors (R, G, B) is fixed when the original image with a uniform reference color is read. This normalization enhances a compatibility with various types of image forming apparatuses. Furthermore, this normalization enables a correct tone reproduction even in the cases of a replacement of the line sensor, a dispersion in light receiving sensitivity of the line sensor in mass production of the image reading apparatus, and a change with time in the optical system.

In the conventional image reading apparatus, the white balance correction is carried out at the stage of digitization of the photoelectric conversion output. That is, an analog reference potential to be applied to an A/D converter is adjusted in digitization for each color so that the image data of each color becomes uniform when reading a reference color image.

The A/D converter need be provided for each of those primary colors since it is totally impossible to adjust a reference potential for each color in accordance with read scanning of the respective colors to be carried out almost simultaneously, in a fast image reading apparatus. Further, the correction involves analog processing, so that an accuracy in correction is easily affected by an external factor such as temperature.

In automation of the white balance correction by employing a CPU (Central Processing Unit), in particular, it is indispensable to provide a digital/analog (D/A) converter for generating a reference voltage in accordance with data showing a result of arithmetic operation of the CPU, in addition to the A/D converter. Consequently, the configuration of a correction apparatus is complicated.

Further, since a solid image pickup element such as CCD involves a limitation in size due to the size of a semiconductor wafer, the line sensor comprises a plurality of CCD chips in an image reading apparatus for reading images of A3 and A4 in size. Thus, a line sensor consisting of a 5-chip configuration, for example, requires three sets of A/D converters and D/A converters for each chip, i.e., totally 30 converters (3 colors×5 chips×2 kinds), resulting in a large-scale and expensive apparatus.

Meanwhile, a uniformity of image data, called a shading correction, is effected in order to correct a dispersion in image data due to a sensitivity difference between image pickup elements, a light intensity distribution (an unevenness in quantity of light) of a light source in the main scanning direction, a distortion in a lens and the like. That is, before reading the original, a reference color image with a uniform density is previously read, and reference image data corresponding to one line is stored. Thus the image data is corrected for each pixel in accordance with the reference image data in sending-/receiving an image signal for the original.

FIGS. 1 and 2 are block diagrams showing schematic configurations of shading correction circuits S1 and S2, employed in the conventional image reading apparatuses.

The shading correction circuit S1, shown in FIG. 1, is based on a so-called table index method and comprises an RAM 71 for storing reference image data SD7, and an ROM 72 as a shading correction table in which image data Do7 for correction, previously prepared, is written.

The RAM 71 writes the reference image data SD7 corresponding to one line before reading the original. The RAM 71 outputs the reference image data SD7 which is previously read by the image pickup element in synchronization with inputting of the image data Di7 which is read from an original by the same image pickup element.

Addressing of the ROM 72 is carried out by the image data Di7 and the reference image data SD7, so that the ROM 72 outputs the correction image data Do7 of a designated address.

The shading correction circuit S2, shown in FIG. 2, employs a reciprocal coefficient multiplication method and comprises a RAM 81 for storing reference image data SD8 or reciprocal coefficient data ID8, reciprocal operation means 82 for generating the reciprocal coefficient data ID8 in response to the reference image data SD8, and a multiplier 83 for multiplying image data Di8 and the reciprocal coefficient data ID8.

The RAM 81 stores the reference image data SD8 corresponding to one line before reading the original.

The reciprocal operation means 82 repeats reading out reference image data SD8 corresponding to one pixel stored in one address of the RAM 81, generating reciprocal coefficient data ID8 corresponding to the read-out reference image data SD8 and writing the generated reciprocal coefficient data ID8 into the RAM 81. As described above, the reference image data SD8 is replaced by the reciprocal coefficient data ID8 for the content of the RAM 81.

The reciprocal coefficient data ID8 responds to a number resulting from reciprocal conversion of the reference image data SD8 as a maximal data to 1. The image data Di8 is multiplied by a coefficient by the arithmetic operation of the multiplier 83. That is, correction image data Do8 which is corrected to be in a relative ratio to the maximum data of the reference image data SD8 is outputted.

In accordance with the table index method as shown in the shading correction circuit S1 of FIG. 1, a change in the content of the correction image data Do7 which is previously prepared in the ROM 72 enables setting an arbitrary correction pattern and thus an optimal shading correction for various factors of a dispersion in image data generated between pixels on one line. However, the fast-operated ROM 72 with a large capacity is required therefor.

Assuming that the image data is of 8 bits (256 gradations), for example, since a bit scheme of the reference image data must also be 8 bits to obtain a maximum correction accuracy, the ROM 72 is required to have one address of 16 bits and a capacity of 64K byte (64K × 8 bits). However, such an ROM integrated circuit device with a large capacity and an access time equal to or less than 50 nsec is not propagated for general purpose. This specially ordered ROM product is considerably expensive, so that an ROM with a capacity of 8K byte is unintentionally employed at present. The shading correction is carried out in this ROM of 8K byte by designating one address of 13 bits by image data of 7 bits (128 gradations) and reference image data of 6 bits.

As described above, in the case of employing the table index method, the number of bits of image data is limited by performance of the ROM, so that a transmission of an image signal with a high gradation cannot be realized. Further, when the number of bits of the reference image data is smaller than that of the image data, a correction range is also narrowed. That is, when the number of bits of the reference image data is less than that of the image data by one bit as in the above case, the correction range is limited to the case that the intensity of the image data is larger than half that of the maximum data, while a correction error occurs in the case that the intensity of the image data is smaller than half that of the maximum data.

Meanwhile, the reciprocal coefficient multiplication method requires no memory with a large capacity, and is suitable for a normal shading correction in which the intensity of a reflected light is almost proportional to the image data.

However, in the shading correction circuit S2 of FIG. 2, since an operation of reciprocal coefficient data corresponding to pixels by one line is carried out before the transmission of the image signal, a long time period is required from reading a reference color image to inputting the image data for the original image, and thus a rapid transmission of the image signal cannot be carried out. Further, dedicated control means (CPU) for controlling the arithmetic operation of the reciprocal coefficient data and the replacement of the content of the RAM 81 is required, resulting in a correction apparatus with high cost and a complicated configuration. Particularly, in the image reading apparatus for reading a color image, since the arithmetic operation of the reciprocal coefficient data is carried out for each separated color of the three primary colors, a triple arithmetic operation time is required. In order to prevent multiplication of this operation time, three sets of the CPUs are required, resulting in a disadvantage in cost.

SUMMARY OF THE INVENTION

It is an object of the present invention to suitably correct and output an image signal in an image reading apparatus.

It is another object of the present invention to carry out an efficient white balance correction in an image reading apparatus.

It is a further object of the present invention to carry out a highly accurate white balance correction in an image reading apparatus.

It is a still further object of the present invention to carry out an economically advantageous white balance correction in an image reading apparatus.

It is still another object of the present invention to carry out an efficient shading correction in an image reading apparatus.

It is a still further object of the present invention to carry out a rapid shading correction in an image reading apparatus.

It is a still further object of the present invention to carry out an economically advantageous shading correction in an image reading apparatus.

In order to achieve the above described objects, an image reading apparatus according to one aspect of the present invention, in which a color image is read to be separated into three primary colors by an image sensor, and image data corresponding to each of the colors is outputted, comprises scanning means for making the image sensor relatively scan for a reference chart and an original, A/D conversion means for converting an output of the image sensor into digital data corresponding to each color of the three primary colors, operation means for evaluating correction data of each color from an output of the image sensor scanning the reference chart, multiplication means for multiplying the digital data of each color by the evaluated correction data, and addition means for adding the digital data to be multiplied to a result of the multiplication by the multiplication means.

In the above constructed image reading apparatus, image data of the original is corrected by the multiplication and addition employing the correction data of each color based on the reference chart, thereby enabling an efficient white balance correction.

In order to achieve the above described objects, the image reading apparatus according to another aspect of the present invention, in which an image of the original is read by the image sensor and then image data is outputted, comprises scanning means for making the image sensor relatively scan for the reference chart and the original, storage means for storing image data of the reference chart corresponding to one line for each element of the image sensor, reciprocal conversion means for reading out the image data from the storage means and converting the read image data into reciprocal data to output the same, multiplication means for multiplying the image data of the original by the reciprocal data outputted from the reciprocal conversion means, and control means for controlling the reciprocal conversion means and the multiplication means so as to output reciprocal data for the image data of the original which is read for each element of the image sensor and to multiply the read image data by the reciprocal data while scanning the image of the original.

In the image reading apparatus constructed as above, the image data of the original is corrected by employing the reciprocal data for each element based on the reference chart, resulting in an efficient shading correction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram of a shading correction circuit in accordance with one embodiment of the present invention.

DESCRIPTION OF THE PREFERRED EMBODIMENTS

An image reader portion IR incorporated in a digital copier will be described as one embodiment of the present invention with reference to the figures.

The digital copier comprises the image reader portion IR as an image reading apparatus, and a laser printer portion LP for forming a color image by an electrophotographic system in accordance with an image signal to be transmitted from the image reader portion IR. The image reader portion IR subjects a pixel signal which is read from an original to various signal processings and then outputs an image signal.

Figure 1:
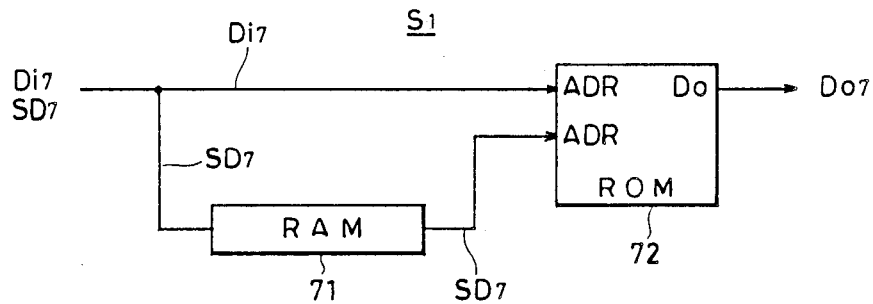
FIG. 1 is a block diagram showing one example of a schematic configuration of a shading correction circuit employed in a conventional image reading apparatus.
Figure 2:
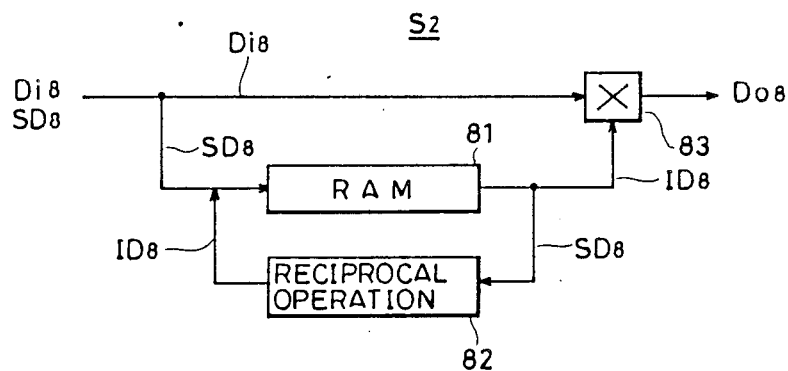
FIG. 2 is a block diagram showing another example of the schematic configuration of the shading correction circuit employed in the conventional image reading apparatus.
Figure 3:
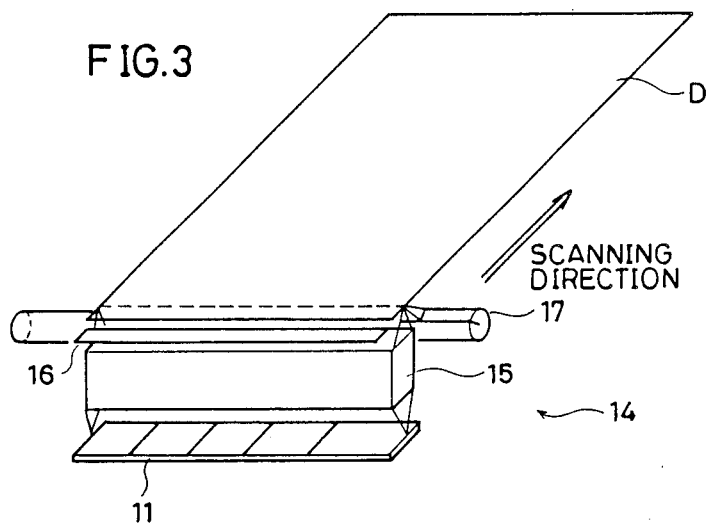
FIG. 3 is a perspective view showing an optical system of an image reader portion in accordance with one embodiment of the present invention.
Figure 4:
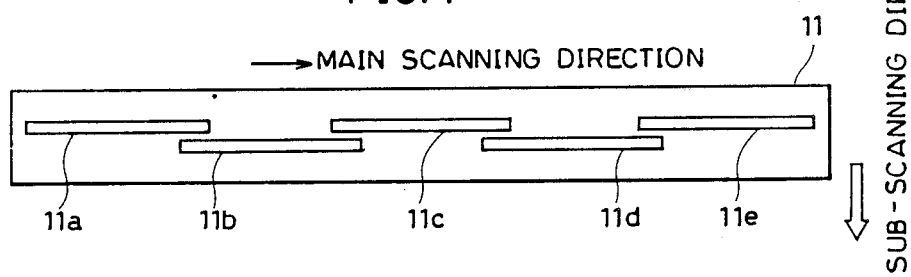
FIG. 4 is a plan view of an image sensor shown in FIG. 3.

FIG. 3 is a perspective view showing an optical system of the image reader portion IR; FIG. 4 is a plan view of an image sensor 11; and FIG. 5 is an enlarged view of a CCD sensor chip 11a of FIG. 4.

As shown in FIG. 3, an original D set on a platen glass (not shown) is line scanned in the sub-scanning direction by a slider 14 comprising an equal-scale magnification type optical system having an exposure lamp 17, a rod lens array 15 and the image sensor 11 image sensor 11 which is arranged to output color signals for three primary colors of R(red), G(green) and B(blue). A photoelectric conversion output signal of each of the colors R, G and B is converted into a signal of three colors of Y (yellow), M (magenta) and C (cyan) or four colors including Bk (black) in addition to those three colors by a color correction circuit 105 which will be described later. After undergoing various signal processings, the converted signal is transmitted as an image signal to the laser printer portion LP forming a color image by a deflection scanning of a laser beam.

As shown in FIG. 4, five CCD sensor chips 11a-11e are arranged by a definite spacing apart from each other in a zigzag manner on the image sensor 11 such that those chips are provided sequentially in a horizontal direction (the main scanning direction) and alternately in a vertical direction (the sub-scanning direction). Due to the definite spacing in the sub-scanning direction, an output signal from the rear CCD sensor chips 11a, 11c and 11e in the sub-scanning direction delays in comparison with that from the front CCD sensor chips 11b and 11d; however, this delay is corrected by delaying output signals from the front CCD sensor chips 11b and 11d.

Figure 5:
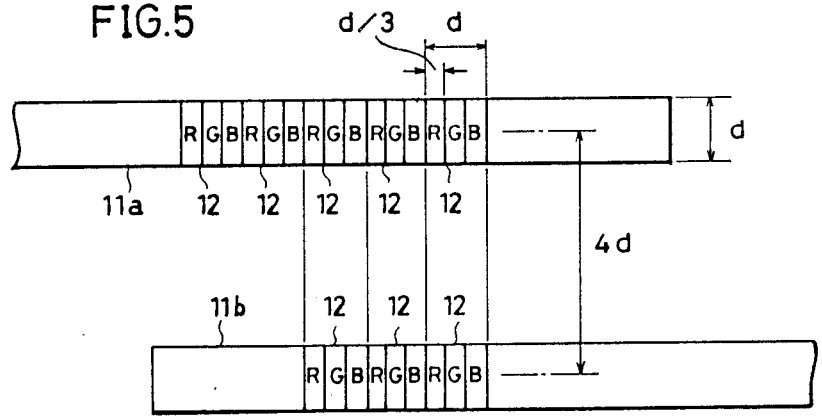
FIG. 5 is an enlarged view of a CCD sensor chip of FIG. 4.

A large number of elements, each of which has a 62.5 $\mu$m (d = 1/16 mm) square in size, are arranged in a row in each of the CCD sensor chips 11a-11e, end portions of which are enlarged and shown in FIG. 5.

Each of the elements is divided in triple, and a spectral filter is provided such that each of the divided regions receives light of one color out of the three primary colors of R, G and B.

The one element corresponds to one pixel into which an original image is fractionated, and the photoelectric conversion output of one element represents the intensity of a reflected light of one color of one pixel.

Figure 6:
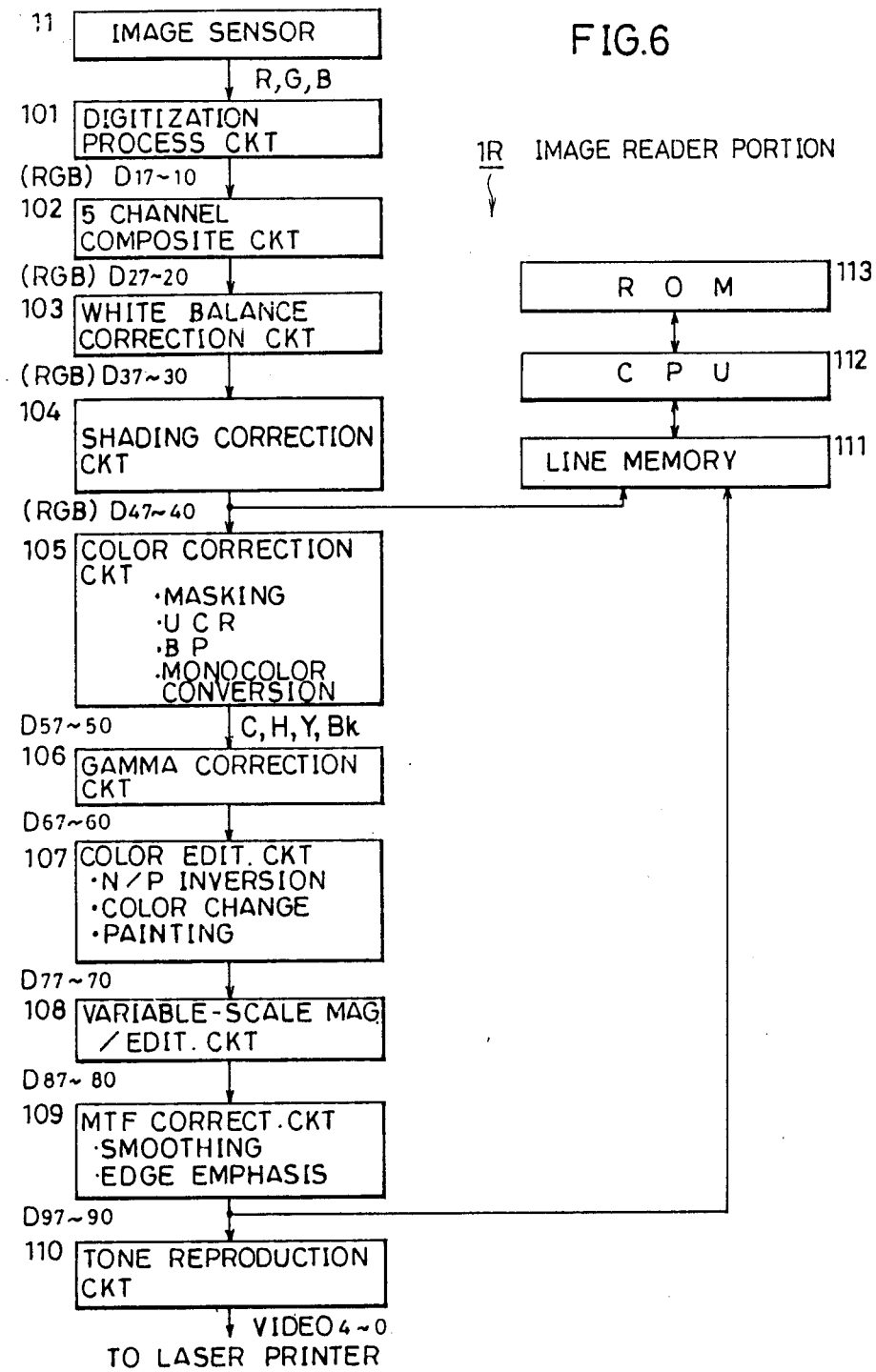
FIG. 6 is a block diagram of an electric circuit of the image reader portion in accordance with one embodiment of the present invention.

FIG. 6 is a block diagram of an electric circuit of the image reader portion IR.

In the image sensor 11, in order to increase reading speed in the main scanning direction, the five CCD sensor chips 11a-11e are simultaneously driven, and effective reading pixel signals corresponding to 2928 pixels in a total of R, G and B are serially outputted from the respective chips.

The photoelectrically converted outputs which are serially outputted from the CCD sensor chips 11a-11e simultaneously (in parallel) are digitized by a digitization processing circuit 101 having a sample and hold circuit and an A/D converter into digital data of 8 bits (256 gradations). This digital data is separated into image data of each color by a latch circuit and is then inputted to a 5 channel composite circuit 102.

The 5 channel composite circuit 102 once stores the image data two lines at a time into FIFO (First-In First-Out) memories of 15 (3×5) in total for each chip and each color. The circuit 102 then sequentially selects and reads out the image data from each chip in one line period, and generates a serial image signal corresponding to an arrangement of pixels (the order of read scanning).

The image data of each color to be transmitted as the serial image signal is normalized with a relative ratio of the respective colors adjusted in a white balance correction circuit 103 so that an image with a correct tone can be formed in the laser printer portion. The white balance correction circuit 103 will be described in detail later.

Next, a shading correction circuit 104 adds a correction for the light intensity distribution (unevenness in the quantity of light) of the exposure lamp 17 in the main scanning direction and for a sensitivity difference between any CCD sensor chips 11a-11e. Further, a data signal in proportion to the intensity of a reflected light is converted in logarithm in accordance with a visual characteristic and is then converted into a density data signal in proportion to a density of the original D. This correction circuit 104 will also be described in detail later.

A color correction circuit 105 carries out a masking processing for generating density data corresponding to three primary colors of Y, M and C of a printing toner from density data corresponding to the respective colors of R, G and B, as described above, and a UCR processing for generating density data corresponding to Bk (black). A gamma correction circuit 106 carries out gamma correction in accordance with a basic color and a density gradation of the original D.

A color editing circuit 107 offers processing for three kinds of color image editing, i.e., negative/positive inversion, color changing and painting.

A variable-scale magnification/edition processing circuit 108 carries out processings for changing timing of and the other of outputting a density data signal, or scanning speed in the sub-scanning direction in order to form a variable-scale magnified image which is enlarged or reduced in size and an image which is edited by movement or so-called mirror inversion processing, by employing a thinning-out method, an operation method or an interpolation method. An MTF correction circuit 109 carries out smoothing for preventing an occurrence of Moire fringe, and an edge emphasis for eliminating an edge loss.

The density data signals D97-90 subjected to those various signal processings are binary processed by an area tone method in a tone reproduction circuit 110 and then transmitted as video signals VIDEO 4-0 to the laser printer portion LP. A line memory stores image data at a specific processing stage. A CPU (Central Processing Unit) 112 controls each of the circuits described above. An ROM 113 stores a program and various data.

Figure 7:
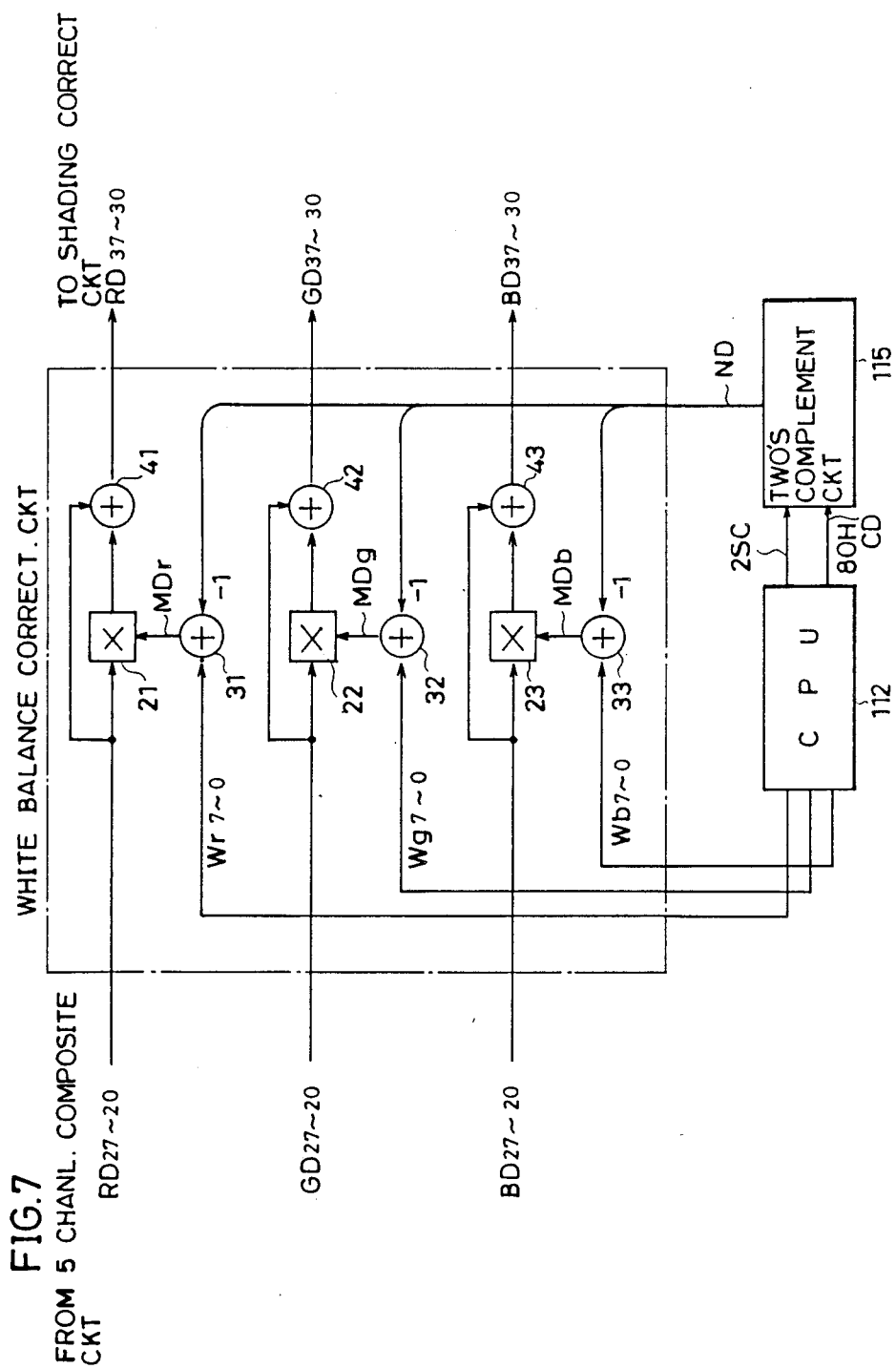
FIG. 7 is a block diagram of a white balance correction circuit in accordance with one embodiment of the present invention.

FIG. 7 is a block diagram of the white balance correction circuit 103 shown in FIG. 6.

The white balance correction circuit 103 carries out correction for image data of the respective colors RD27-20, GD27-20, BD27-20 (of 8 bits respectively) transmitted from the 5 channel composite circuit 102 in accordance with correction coefficient data Wr7-0, Wg7-0, Wb7-0 (of 8 bits respectively) transmitted from the CPU 112, and outputs correction image data RD37-30, GD37-30, BD37-30 (of 8 bits respectively).

This white balance correction circuit 103 comprises multipliers 21-23 to which image data (R, G, B) D27-20 are respectively inputted as a multiplicand, adders 31-33 for adding the respective correction coefficient data Wr7-0, Wg7-0, Wb7-0 to auxiliary data ND from a two's complement circuit 115, which is to be supplied in common to the respective colors, and providing a resultant sum of the addition as multiplier data MDr, MDg, MDb to the respective multipliers 21-23, and adders 41-43 for adding the respective image data (R, G, B) D27-20 to output data of the respective multipliers 21-23 and generating correction image data (R, G, B) D37-30.

The correction coefficient data Wr7-0, Wg7-0, Wb7-0 and the auxiliary data ND both represent a decimal of 8 digits in which a decimal point is placed between the most significant bit and the second significant bit. That is, radical numbers $2^0, 2^{-1}, 2^{-2} \ldots 2^{-7}$ are assigned sequentially from the most significant bit, so that the data are treated as decimal data the value of which varies $1/128$ ($2^{-7}$) by $1/128$.

The two's complement circuit 115 is always supplied with bit signals (an integer 1) of 80 H (1000 0000 B) as converted data CD from the CPU 112. When the most significant bit (a code bit) of the correction coefficient data Wr7-0, Wg7-0, Wb7-0 is "0", the circuit 115 outputs the original converted data CD as positive auxiliary data ND. When the code bit is "1", the circuit 115 outputs two's complement of the converted data CD, i.e., "−1" as negative auxiliary data ND.

The code bit is supplied as a control signal 2SC to the two's complement circuit 115 from the CPU 112.

Each of the circuits in FIG. 7 functions in binary notation, but will be described in decimal notation as follows.

Thus, the multiplier data MD (r, g, b) become equal to values, which are the sum of the respective correction coefficient data Wr7-0, Wg7-0, Wb7-0 and "1", respectively.

Figure 8:
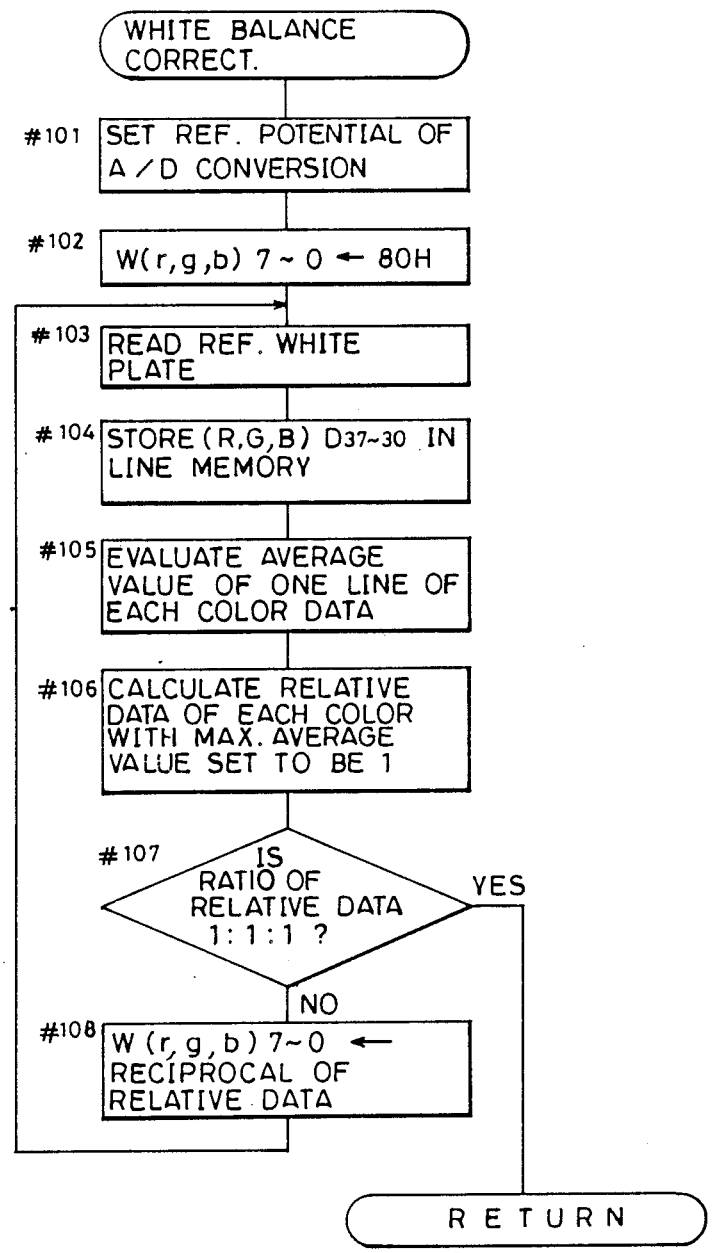
FIG. 8 is a flow chart showing the content of processing of the white balance correction circuit shown in FIG. 7.

FIG. 8 is a flow chart of the white balance correction controlled by the CPU 112.

This processing can optionally be effected in consideration for a change of the optical system with time, but is usually carried out before the scanning of the original D starts.

First, in the step #101, a reference potential of the A/D converter of the digitization processing circuit 101 is set, and an adjustment in level between the CD sensor chips 11a-11e is carried out.

In the step #102, 80 H (an integer 1) is set as the correction coefficient data Wr7-0, Wg7-0, Wb7-0. Accordingly, the multiplier data MD (r, g, b) becomes 0, and a multiplication of 0 times is carried out in the multipliers 21-23. Thus, the image data (R, G, B) D27-20 are outputted as they are as the correction image data (R, G, B) D37-30 from the adders 41-43.

Next, in the step #103, the exposure lamp 17 is lit at a standby position of the slider 14, and the CCD sensor chips 11a-11e read a reference white plate 16 (referred to FIG. 3) with a uniform density provided at end portions of the platen glass. Ideally, when a reference white image is read, the image data of the three primary colors are equal to each other. In actual practice, however, a difference occurs between the respective image data of the R, G and B due to a spectral sensitivity of the CCD sensor chips 11a-11e and the like.

Therefore, in this embodiment, an evaluation processing is carried out on the correction coefficient data Wr7-0, Wg7-0 Wb7-0 in the following steps #104-108 for a normalization with a ratio of the R, G and B to be 1:1:1.

In the step #104, the correction image data (R, G, B) D37-30 which are outputted substantially kept incorrect as described above, are stored in the line memory 111 one by one line through the shading correction circuit 4. At this time, the shading correction circuit 104 carries out no correction, but controls the inputted correction image data (R, G, B) D37–30 so as to pass the data as they are.

Next, an average value in one line is evaluated for each color, in the step #105. In the step #106, relative data of each color is evaluated, assuming that a largest one of the three average values is "1". In the step #107, it is decided whether or not a ratio of the respective relative data is 1:1:1. If the ratio is determined as 1:1:1 in the step #107, it means that a normalization is completed, so that the procedure returns to a main routine on which other image progressings and an operation of each portion of the digital copier are controlled. On the other hand, if the ratio is not determined as 1:1:1, the procedure goes on to the step #108.

In the step #108, a reciprocal of the relative data for each color is set as the correction coefficient data Wr7–0, Wg7–0, Wb7–0, and at the same time, a value of the code bit is provided to the two's complement circuit 115 as the control signal 2SC, then returning to the step #103.

Assuming that the respective values of the relative data of the R, G and B are 1, 0.95, and 0.65, for example, 1/1 as the correction coefficient data Wr7–0, 1/0.95 (=1+5/95) as the data Wg7–0, and 1/0.65 (1+35/65) as the data Wb7–0 are set, respectively.

In this case, since the multiplier data MDr, MDg and MDb to be added to the respective multipliers 21-23 are the result of subtracting "1" from the respective correction coefficient data Wr7–0, Wg7–0, Wb7–0, the multiplier data are 0, 5/95 and 35/65, respectively.

Here, when the reference white plate 16 is read again in the step #103, the image data identical to the previous one, i.e., the data (R, G, B) D37–30 in which the relative data are the respective values of 1, 95/100 and 65/100, are inputted to the white balance circuit 103.

The multiplier 22 for the data of G multiplies 5/95 times, and consequently, the adder 42 outputs correction image data GD37–30 of 100/100 made by the addition of an output of the multiplier 22, the value of which is 5/100 (=(5/95)×(95/100)) and a value of the data GD27–20, 95/100.

Similarly, the multiplication and addition are also carried out for the data of B, and the adder 43 outputs correction image data BD37–30 equal to correction image data RD37–30 for the data of R.

Therefore, the ratio of the correction image data (R, G, B) D37–30 of the respective colors, which correspond to the image data (R, G, B) D27–20 reading the reference white plate, is 1:1:1, resulting in a completion of the white balance correction.

When reading the original D thereafter, the white balance correction circuit 103 corrects image data inputted from the preceding stage and transmits the corrected data to an image processing circuit at the succeeding stage by performing an arithmetic operation in accordance with the set correction efficient data Wr7–0, Wg7–0, Wb7–0.

According to the above described embodiment, the correction image data (R, G, B) D37–30 which are normalized with respect to a tone are generated by adding the original image data (R, G, B) D27–20 to a result of multiplying the multiplier data MDr, MDg, MDb made by subtracting "1" from the correction efficient data Wr7–0, Wg7–0, Wb7–0 for each color, and the input image data (R, G, B) D27–20. This generation of the correction image data makes a correction range wider than that of the correction only by multiplication.

That is, in case of employing the multipliers 21-23 of 8 bits based on input/output image data, the largest number of bits of the multiplier data MDr, MDg, MDb to be added to the multipliers 21-23 is also 8 bits. The limitation in the number of bits as above determines a correction range and a correction accuracy which are reciprocally related by a position where a decimal point is set. When the upper 2 bits represent an integer by placing a decimal point between the second significant bit and the third significant bit, and the lowest 6 bits represent numerals placed lower than the decimal point, for example, it is possible to represent the numerals of 0 to 4 (precisely "0" to "3+63/64"). Therefore, the correction range becomes 0 to 4 times wide; however, since the radical number $2^{-6}$ is assigned to the least significant bit, the correction accuracy becomes 1/64 by 1/64.

Since the radical number $2^{-7}$ is assigned to the least significant bits of the multiplier data MDr, MDg, MDb in the above described embodiment, the correction accuracy 1/128 by 1/128 is ensured. However, 1 bit is assigned to the integer, so that the correction range becomes 0 times to twice wide with this bit scheme when corrected only by multiplication. Consequently, an accurate correction cannot be effected when the minimum input image data becomes half the maximum input image data.

Thus, an arithmetic operation which is a combination of the multiplication and addition, as in the above embodiment, i.e., an addition of doubled input image data and the original input image data results in correction image data three times the original input image data. Therefore, even when the minimum input image data is ⅓ the maximum input image data, the ratio of the correction image data (R, G, B) D37–30 of the respective colors can be set to be 1:1:1. This configuration enables, for example, an enhancement in freedom of a selection of the CCD sensor chip 11a with respect to characteristics.

The circuit configuration intended to make the correction range wider is not limitative to the one exemplified. The same result as in the above embodiment can be obtained, for example, even by omitting the adders 31-33 of this embodiment and adding the correction coefficient data Wr7–0, Wg7–0, Wb7–0 as a multiplier directly to the respective multipliers 21-23, and instead by adding output data of the respective multipliers 21-23 to the adders 41-43 as they are when the most significant bit (the code bit) of the correction coefficient data Wr7–0, Wg7–0 Wb7–0 is "0", or by converting the output data into two's complement and adding the converted data to the adders 41-43 when the most significant bit of the correction coefficient data is "1".

According to the above described embodiment, since other image data is matched to the maximum one of the correction image data (R, G, B) D37–30 of the respective colors inputted, a dynamic range set at the preceding stage is not deteriorated.

In addition, the evaluation of the correction coefficient data Wr7–0, Wg7–0, Wb7–0 is carried out based on an average value by one line of the image data (R, G, B) D27–20 of each color in order to enhance a reliability in correction. In case that there is a slight dispersion in characteristics between the CCD sensor chips 11a-11e or between the elements, however, the correction coefficient data Wr7–0, Wg7–0 Wb7–0 may be evaluated based on the image data (R, G, B) D27–20 by 1/5 line or one pixel.

Further, in the above embodiment, a normalization is carried out such that the ratio of the correction image data of each color is 1:1:1. However, it is possible to appropriately determine with the same configuration a convenience of the image processing at the succeeding stage and of the processing in the image forming apparatus, or the ratio of the respective data in accordance with a color of an image to be a reference.

In accordance with the present invention, after an output of the one-dimensional image sensor, which reads the original image to separate it into three primary colors is digitized, a normalization with respect to a tone is carried out for image data corresponding to each color by a digital operation. Therefore, A/D conversion means need not be provided for each color, resulting in a simplified configuration and further a stable correction accuracy due to digital processing.

FIG. 9 is a block diagram of the shading correction circuit 104 in accordance with one embodiment of the present invention.

The shading correction circuit 104 comprises a shading correction portion SH provided for each of the image data RD37-30, GD37-30, BD37-30 (8 bits for each) of the respective three primary colors from the white balance correction circuit 103, and a density conversion ROM 300. FIG. 9 shows only a portion with respect to the image data RD37-30 since each of the three primary colors has the same circuit configuration.

This shading correction portion SH comprises an RAM 231 for storing through a gate circuit 234 reference image data SDr corresponding to one line, which are read from the reference white plate 16 (referred to FIG. 3) as a reference color image, a reciprocal conversion ROM 232 for outputting through a gate circuit 235 reciprocal data IDr of the reference image data SDr read from the RAM 231, and a multiplier 233 for multiplying the image data RD37-30, which are read from the original image, and the reciprocal data IDr together.

The RAM 231 with a capacity of 8K byte can store the reference image data SDr corresponding to one line (8000 pixels) in the main scanning direction. However, since the data writing and reading are carried out through a common input/output port, the gate circuits 234 and 235 are provided for avoiding a collision of input/output data. Addressing for the RAM 231 is incremented in accordance with an image clock signal SYNCK and is carried out by an address counter 236 for carrying out initialization in accordance with a horizontal synchronization signal TG defining one line period. The image clock signal SYNCK is to be a reference of timing to transmit image data between any image processing circuits described above.

When a power is supplied to the image reader portion IR, the exposure lamp 17 is immediately lit at a standby position of the slider 14 (referred to FIG. 3), and then the reference white plate 16 with a uniform density, provided at the end portions of the platen glass, is read. At the same time, a write control enable signal $\overline{SHWR}$ to be applied from the CPU 112 becomes active (active low), so that read reference image data DS corresponding to one line is stored one by one pixel in turn from a heading address of the RAM 231 in a sequence of arranged pixels, resulting in a completion of a preparation for transmitting an image signal, i.e., a completion of a preparation for shading correction.

In reading the original D, the signal $\overline{SHWR}$ becomes inactive, and instead a shading correction enable signal $\overline{SHON}$ becomes active, so that the reference image data SDr is read in turn from the heading address of the RAM 231 in synchronization with an input of the image data RD37-30 from the preceding stage in accordance with the signal SYNCK.

In A/D conversion in the described digitization processing circuit 101, a maximal value of a photoelectric conversion signal from the element 12 is adjusted to be 225 (11111111 B). Thus, the reference image data SDr, which are read from a reference white image, ideally all attain the value 255; however, in actual practice, some of the reference image data SDr attain the signal value equal to or less than 254 due to a light intensity distribution of the exposure lamp 17, a spectral sensitivity of the element 12 and the like, resulting in a difference between any pixels.

Therefore, in this embodiment, reciprocal data IDr are previously prepared in the reciprocal conversion ROM 232 for all the values which the reference image data SDr can obtain, in order to eliminate a difference between any pixels and make one line uniform. In the reciprocal conversion ROM 232 with a capacity of 256 byte, the reference image data SDr read from the RAM 231 addresses, so that reciprocal data IDr of the designated address is read out.

The reciprocal data IDr of 8 bits is a decimal of 8 digits in which a decimal point is placed between the most significant bit and the second significant bit and to which radical numbers $2^0, 2^{-1}, 2^{-2} \ldots 2^{-7}$ are sequentially assigned from the most significant bit. The reciprocal data IDr corresponds to a decimal of 1 (1000 0000 B) to 255/128 (1111 1111 B) out of decimals of 0 to 255/128, with its value varying 1/128 ($2^{-7}$) by 1/128 which can be displayed by a total sum of the numerals assigned to the respective bits.

That is, the reference image data SDr of 128 to 255 correspond to reciprocal values made by conversion of the maximum data 255 as 1, and the reference image data SDr of a signal value equal to or less than 127 correspond to 255/128 identical with the signal value 128; i.e., a signal value 255 of the reference image data SDr corresponds to 255/255 (=1), the value 200 corresponds to 255/200, and the value 128 corresponds to 255/128.

The multiplier 233 carries out multiplication of the image data RD37-30 read at the same element 12 and the reciprocal data IDr corresponding to the reference image data SDr. Therefore, the image data RD37-30 read by the element 12, in which a signal value of the reference image data SDr is equal to or more than 128 when reading the reference white plate 16, are multiplied by the reciprocal data IDr and then outputted from the shading correction portion SH as correction image data Dor7-0 subjected to an accurate shading correction. When the signal value of the image data RD37-30 read by the element 12, in which the signal value of the reference image data SDr is 200, is 150, for example, a multiplication of 150×(255/200) is carried out, and consequently a signal value to be outputted is corrected to 204.

Pixels, in which the reference image data SDr is equal to or lower than 127 when reading the reference white plate 16, are each uniformly almost doubled and outputted.

The correction image data Dor7-0 outputted as above are inputted to the density conversion ROM 300 and then added as a density conversion table index address to the density conversion ROM 300. Logarithm conversion data RD47-40 corresponding to values of the correction image data Dor7-0 are read out from the density conversion ROM 300 and then transmitted as density data in proportion to a density of the original D to the color correction circuit 105 at the succeeding stage.

While the address counter 236 for addressing the RAM 231 may be provided for each color of the three primary colors in the above describe embodiment, one address counter may address each color when input/output of the image data of the respective colors are synchronized with one another.

In accordance with the present invention, a memory device with high speed and a large capacity is not necessary because the present invention is not based on the table index method. Further, a rapid shading correction can be carried out because reciprocal data to be a correction coefficient is generated while reading the reference image data which read a reference color image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus for reading a color image to separate the image into three primary colors by an image sensor and outputting image data corresponding to each of the colors, comprising:

scanning means for making the image sensor relatively scan for a reference chart and an original;

A/D conversion means for converting an output of said image sensor into digital data corresponding to each of the three primary colors;

operation means for evaluating correction data of said each color from the output of said image sensor when said image sensor scans said reference chart;

multiplication means for multiplying digital data of said each color by said evaluated correction data; and addition means for adding digital data before being multiplied to a result of the multiplication by said multiplication means.

2. An image reading apparatus in accordance with claim 1, wherein said operation means evaluates relative data between any said respective colors of the output of said image sensor for said reference chart, and evaluates correction data of said respective colors from a reciprocal of said relative data.

3. An image reading apparatus in accordance with claim 2, wherein said operation means determines a value made by subtracting "1" from said reciprocal of said relative data as the correction data.

4. An image reading apparatus in accordance with claim 1, further, comprising:

shading correction means provided at a succeeding stage of said addition means; and a line memory provided at a succeeding stage of said shading correction means, wherein said operation means evaluates the correction data from data stored in said line memory; the apparatus further comprising:

control means for controlling said shading correction means so that said shading correction means outputs input data as they are, when said operation means evaluates the correction data.

5. An image reading apparatus in accordance with claim 4, wherein said shading correction means comprises storage means for storing digital data of said reference chart read;

reciprocal conversion means for outputting reciprocal data of the digital data stored in said storage means; and multiplication means for multiplying said reciprocal data outputted by digital data of said original read.

6. In an image reading apparatus for reading a color image to separate the image into three primary colors by an image sensor and outputting image data corresponding to each of the colors, a method of correcting a white balance among the colors comprising the steps of:

scanning a reference chart prior to an original;

A/D converting an output of said image sensor for said reference chart to output digital data;

evaluating correction data for said each color from digital data of said each color; and correcting digital data for said original by employing the correction data, said correction step comprising the steps of multiplying the digital data of said each color by the correction data, and adding digital data of a selected one of said colors to a result of the multiplication.

7. A method of claim 6, wherein said correction data evaluating step comprises the steps of evaluating an average value of digital data corresponding to one line of said each color, assuming that a maximal one of the evaluated average values for said respective colors is 1, evaluating relative data of the other average values, and evaluating the correction data from each of said evaluated relative data.

8. A method of claim 7, wherein an operation of the correction data from the relative data is carried out by subtracting "1" from a reciprocal of the relative data.

9. An image reading apparatus for reading an image of an original by an image sensor and outputting image data, comprising;

scanning means for making said image sensor relatively scan for a reference chart and the original;

storage means for storing image data of the reference chart corresponding to one line for each element of said image sensor;

reciprocal conversion means for reading the image data from said storage means, converting the read image data into reciprocal data and outputting the reciprocal data;

multiplication means for multiplying the image data of the original by the reciprocal data outputted from said reciprocal conversion means; and control means for controlling said reciprocal conversion means and said multiplication means so that reciprocal data is outputted in correspondence with the image data of the original read for said each element of said image sensor, and said image data read is multiplied by the reciprocal data while scanning the image of the original.

10. An image reading apparatus in accordance with claim 9, wherein said reciprocal conversion means evaluates the reciprocal data corresponding to said each element, based on image data of a maximum value out of the image data of said reference chart for said each element of said image sensor.

* * * * *